United States Patent
Jiang et al.

(10) Patent No.: US 9,354,965 B2
(45) Date of Patent: May 31, 2016

(54) METHOD AND APPARATUS FOR ISOLATING A FAULT IN A CONTROLLER AREA NETWORK

(71) Applicant: GM GLOBAL TECHNOLOGY OPERATIONS LLC, Detroit, MI (US)

(72) Inventors: Shengbing Jiang, Rochester Hills, MI (US); Yilu Zhang, Northville, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 138 days.

(21) Appl. No.: 14/333,374

(22) Filed: Jul. 16, 2014

(65) Prior Publication Data

US 2015/0113328 A1   Apr. 23, 2015

Related U.S. Application Data (60) Provisional application No. 61/892,506, filed on Oct. 18, 2013.

(51) Int. Cl.
*G06F 11/07* (2006.01)
*H04L 12/26* (2006.01)

(52) U.S. Cl.
CPC .......... *G06F 11/079* (2013.01); *G06F 11/0739* (2013.01); *H04L 43/00* (2013.01)

(58) Field of Classification Search
CPC ... G06F 11/079; G06F 11/0739; H04L 43/00; H04L 43/16; H04L 43/0811; H04L 4/0213; H04L 4/06; H04L 4/0677
See application file for complete search history.

(56) References Cited

U.S. PATENT DOCUMENTS

| | | | |
|---|---|---|---|
| 7,812,617 B2 | 10/2010 | Hofman | |
| 8,213,321 B2 * | 7/2012 | Butts | H04L 41/0659 370/242 |
| 8,305,877 B2 * | 11/2012 | Sabet | H04B 10/03 370/216 |
| 9,009,523 B2 * | 4/2015 | Jiang | G06F 11/2005 714/4.5 |
| 9,059,758 B2 * | 6/2015 | Hammarwall | H04B 7/063 |
| 9,110,951 B2 * | 8/2015 | Jiang | G06F 11/3048 |
| 2006/0020379 A1 * | 1/2006 | Salman | B60T 8/885 701/30.2 |
| 2011/0058806 A1 * | 3/2011 | Sabet | H04B 10/03 398/1 |
| 2011/0188371 A1 | 8/2011 | Brunnberg et al. | |
| 2012/0158240 A1 * | 6/2012 | Downs, Jr. | H04L 67/12 701/30.1 |
| 2013/0136007 A1 | 5/2013 | Jiang et al. | |
| 2013/0325203 A1 | 12/2013 | Lu | |
| 2015/0082089 A1 * | 3/2015 | Jiang | G06F 11/3048 714/25 |

* cited by examiner

*Primary Examiner* — Nadeem Iqbal (57) ABSTRACT

A method for monitoring controller area network (CAN) on a mobile system includes identifying links and associated nodes between all the nodes of the CAN, and ranking all the links according to their order of connection to the monitoring controller, including assigning lower ranks to ones of the links proximal to the monitoring controller and assigning higher ranks to ones of the links distal to the monitoring controller. For each of said links, the associated node distal to the monitor is identified. The on-board monitoring controller determines a fault signature for each of the links starting with the link having the highest ranking, said fault signature comprising identified ones of the associated nodes distal to the monitor for each of the corresponding links.

12 Claims, 5 Drawing Sheets

METHOD AND APPARATUS FOR ISOLATING A FAULT IN A CONTROLLER AREA NETWORK

CROSS REFERENCE TO RELATED APPLICATIONS

This application claims the benefit of U.S. Provisional Application No. 61/892,506 filed on Oct. 18, 2013, which is incorporated herein by reference.

TECHNICAL FIELD

This disclosure is related to fault isolation associated with communications in controller area networks.

BACKGROUND

The statements in this section merely provide background information related to the present disclosure. Accordingly, such statements are not intended to constitute an admission of prior art.

Vehicle systems include a plurality of subsystems, including by way of example, engine, transmission, ride/handling, braking, HVAC, and occupant protection. Multiple controllers may be employed to monitor and control operation of the subsystems. The controllers can be configured to communicate via a controller area network (CAN) to coordinate operation of the vehicle in response to operator commands, vehicle operating states, and external conditions. A fault can occur in one of the controllers that affects communications via a CAN bus.

Topology of a network such as a CAN refers to a connective arrangement among network elements, and preferably includes a plurality of nodes having interconnected or dispersed power, ground or communications links. A physical topology describes arrangement or layout of physical elements including links and nodes, wherein nodes include controllers and other connected devices and links include either power, ground or communications links in the form of suitable cables, wires, printed wiring boards (PWBs), printed circuit boards (PCBs), flexible strips, and the like. A logical topology describes flow of data messages, power or grounding within a network between nodes employing power, ground or communications links. Known CAN systems employ a bus topology for the communication connection among all the controllers that can include a linear topology, a star topology, or a combination of star and linear topologies. Known high-speed CAN systems employ linear topology, whereas known low-speed CAN systems employ a combination of the star and linear topologies. Known CAN systems employ separate power and ground topologies for the power and ground lines to all the controllers. Known controllers communicate with each other through messages that are sent at different periods on the CAN bus.

Known systems detect faults at a message-receiving controller, with fault detection accomplished for the message using signal supervision and signal time-out monitoring at an interaction layer of the controller. Faults can be reported as a loss of communications, e.g., a loss of a communicated data message. Such detection systems generally are unable to identify a root cause of a fault, and are unable to distinguish transient and intermittent faults. One known system requires separate monitoring hardware and dimensional details of a physical topology of a network to effectively monitor and detect communications faults in the network.

A fault signature for a network topology can be generated off-board and flash-programmed into a system during vehicle manufacturing and assembly. In one embodiment of a vehicle system, there can be a plurality of topology variations due to differing vehicle and controller configurations. This adds complexity of timing management in a vehicle manufacturing plant and may reduce the manufacturing throughput.

SUMMARY

A controller area network (CAN) on a mobile system including a plurality of linked communications nodes including an on-board monitoring controller is described. A method for monitoring the CAN includes identifying links and associated nodes between all the nodes of the CAN, and ranking all the links according to their order of connection to the monitoring controller, including assigning lower ranks to ones of the links proximal to the monitoring controller and assigning higher ranks to ones of the links distal to the monitoring controller. For each of said links, the associated node distal to the monitor is identified. The on-board monitoring controller determines a fault signature for each of the links starting with the link having the highest ranking, said fault signature including identified ones of the associated nodes distal to the monitor for each of the corresponding links.

BRIEF DESCRIPTION OF THE DRAWINGS

One or more embodiments will now be described, by way of example, with reference to the accompanying drawings, in which:

FIGS. 5-1 through 5-10 illustrate execution of the on-board routine to derive fault signatures for an embodiment of a CAN, including showing progression through the on-board routine to derive the fault signatures, in accordance with the disclosure.

DETAILED DESCRIPTION

Figure 1:
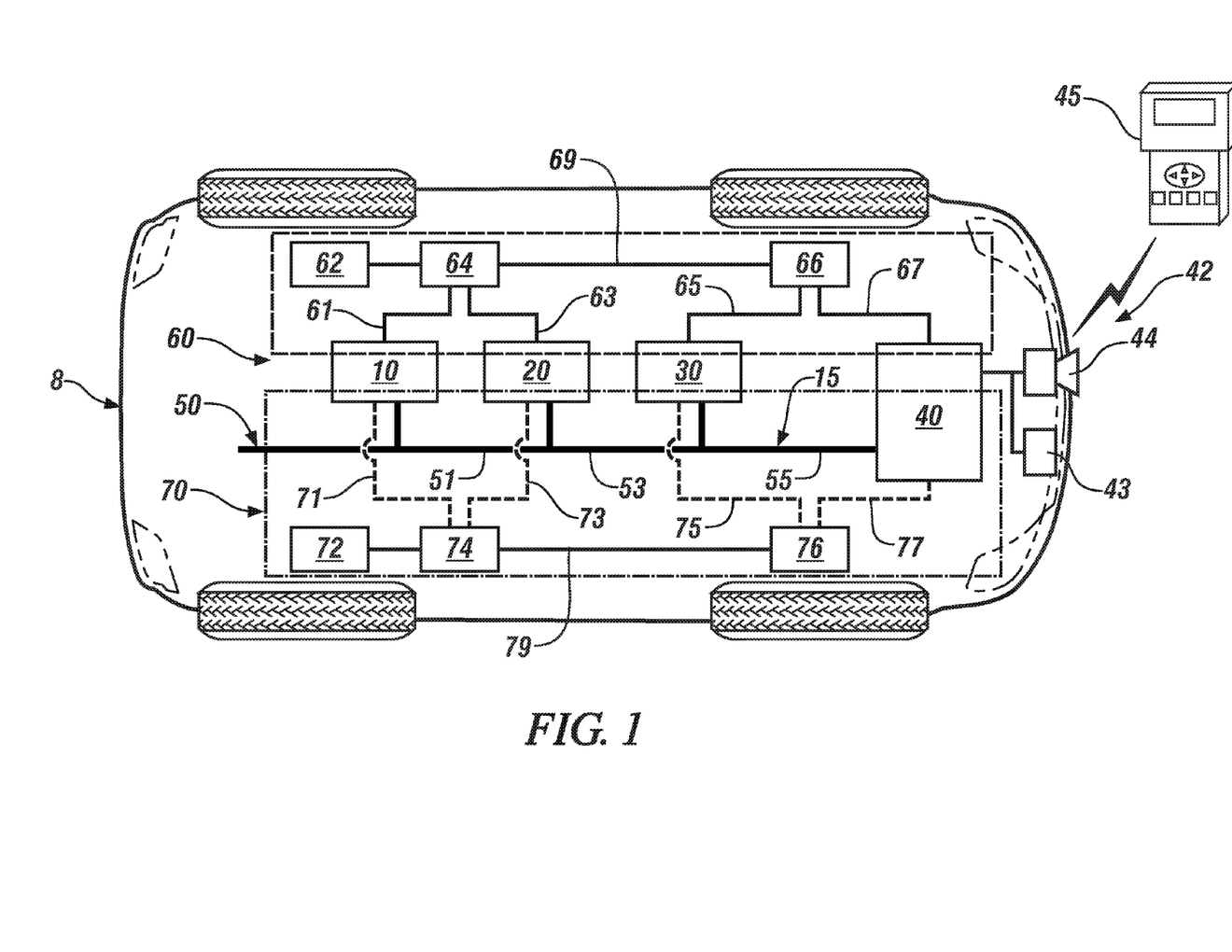
FIG. 1 illustrates a mobile vehicle including a controller area network (CAN) including a CAN bus and a plurality of nodes, e.g., controllers, and an off-board device, in accordance with the disclosure.

Referring now to the drawings, wherein the showings are for the purpose of illustrating certain exemplary embodiments only and not for the purpose of limiting the same, FIG. 1 schematically illustrates a mobile vehicle 8 including a controller area network (CAN) 50 including a CAN bus 15 and a plurality of nodes, i.e., controllers 10, 20, 30 and 40. The term "node" refers to any active electronic device that signally connects to the CAN bus 15 and is capable of sending, receiving, and/or forwarding information over the CAN bus 15. Each of the controllers 10, 20, 30 and 40 signally connects to the CAN bus 15 and electrically connects to a power grid 60 and a ground grid 70. Each of the controllers 10, 20, 30 and 40 is an electronic controller or another on-vehicle electronic device that is configured to monitor and/or control operation and/or control communications in a subsystem of the vehicle 8 and communicate via the CAN bus 15. In one embodiment, one of the controllers, e.g., controller 40, is configured to monitor the CAN 50 and the CAN bus 15, and may be referred to herein as a monitor, a CAN monitor, or a monitoring node. Alternatively, or in addition, each of the controllers 10, 20, 30 and 40 may be configured to monitor the CAN 50 and the CAN bus 15. Controller 40 signally connects to a communications device 42 that is configured to communicate a digital message to an off-board device 45 employing a direct hard-wire connection 43 and/or a wireless telematics connection 44. The direct hard-wire connection 43 and the wireless telematics connection 44 employ any suitable communications protocol(s).

The illustrated embodiment of the CAN 50 is a non-limiting example of a CAN that may be employed in any of a plurality of system configurations. Each CAN employs a network topology that includes a physical arrangement of power, ground, and communication links between the nodes including controllers and other electronic devices. A network topology such as a CAN refers to a connective arrangement among network elements, and preferably includes a plurality of nodes having interconnected or dispersed power, ground or communications links therebetween. Topology graphs are developed, including a communications topology, a power topology and a ground topology. The network topology relates to communications, power and ground connectivity among the nodes and other elements, e.g., power and ground sources, and physical or linear distances between nodes, physical interconnections, transmission rates, and/or signal types are secondary considerations. Thus, a common network topology may be found on different vehicle configurations that provide similar or common functions.

The CAN bus 15 includes a plurality of communications links, including a first communications link 51 between controllers 10 and 20, a second link communications 53 between controllers 20 and 30, and a third communications link 55 between controllers 30 and 40. The power grid 60 includes a power supply 62, e.g., a battery that electrically connects to a first power bus 64 and a second power bus 66 to provide electric power to the controllers 10, 20, 30 and 40 via power links. As shown, the power supply 62 connects to the first power bus 64 and the second power bus 66 via power links that are arranged in a series configuration, with power link 69 connecting the first and second power buses 64 and 66. The first power bus 64 connects to the controllers 10 and 20 via power links that are arranged in a star configuration, with power link 61 connecting the first power bus 64 and the controller 10 and power link 63 connecting the first power bus 64 to the controller 20. The second power bus 66 connects to the controllers 30 and 40 via power links that are arranged in a star configuration, with power link 65 connecting the second power bus 66 and the controller 30 and power link 67 connecting the second power bus 66 to the controller 40. The ground grid 70 includes a vehicle ground 72 that connects to a first ground bus 74 and a second ground bus 76 to provide electric ground to the controllers 10, 20, 30 and 40 via ground links. As shown, the vehicle ground 72 connects to the first ground bus 74 and the second ground bus 76 via ground links that are arranged in a series configuration, with ground link 79 connecting the first and second ground buses 74 and 76. The first ground bus 74 connects to the controllers 10 and 20 via ground links that are arranged in a star configuration, with ground link 71 connecting the first ground bus 74 and the controller 10 and ground link 73 connecting the first ground bus 74 to the controller 20. The second ground bus 76 connects to the controllers 30 and 40 via ground links that are arranged in a star configuration, with ground link 75 connecting the second ground bus 76 and the controller 30 and ground link 77 connecting the second ground bus 76 to the controller 40. Other topologies for distribution of communications, power, and ground for the controllers 10, 20, 30 and 40 and the CAN bus 15 can be employed with similar effect.

The off-board device 45 can include a hand-held scan tool that is employed in a service bay at a vehicle diagnostic and repair center. The off-board device 45 can also include a remotely located service center. The off-board device 45 is configured to communicate with the communications device 42, including interrogating the controller 40 for messages. The off-board device 45 preferably includes a controller element, a memory element including a system-specific network topology that can be correlated to the CAN 50 and an analytical element that executes as described herein to remotely identify a fault in the CAN 50. As described herein, the on-board monitoring controller, e.g., controller 40 generates a fault signature for each of the links for the system-specific network topology that can be communicated to the off-board device 45, and the off-board device 45 can be employed to detect and isolate a fault based thereon.

Control module, module, control, controller, control unit, ECU, processor and similar terms mean any one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), input/output circuit(s) and devices, appropriate signal conditioning and buffer circuitry, and other components to provide the described functionality. Software, firmware, programs, instructions, routines, code, algorithms and similar terms mean any instruction sets including calibrations and look-up tables. The control module has a set of control routines executed to provide the desired functions. Routines are executed, such as by a central processing unit, and are operable to monitor inputs from sensing devices and other networked control modules, and execute control and diagnostic routines to control operation of actuators. Routines may be executed at regular intervals, for example each 100 microseconds, 3.125, 6.25, 12.5, 25 and 100 milliseconds during ongoing engine and vehicle operation. Alternatively, routines may be executed in response to occurrence of an event.

Each of the controllers 10, 20, 30 and 40 transmits and receives messages across the CAN 50 via the CAN bus 15, with message transmission rates that may be at either the same or at different periods for different ones of the controllers. A CAN message has a known, predetermined format that includes, in one embodiment, a start of frame (SOF), an identifier (11-bit identifier), a single remote transmission request (RTR), a dominant single identifier extension (IDE), a reserve bit (r0), a 4-bit data length code (DLC), up to 64 bits of data (DATA), a 16-bit cyclic redundancy check (CDC), 2-bit acknowledgement (ACK), a 7-bit end-of-frame (EOF) and a 3-bit interframe space (IFS). A CAN message can be corrupted, with known errors including stuff errors, form errors, ACK errors, bit 1 errors, bit 0 errors, and CRC errors. The errors are used to generate an error warning status including one of an error-active status, an error-passive status, and a bus-off error status. The error-active status, error-passive status, and bus-off error status are assigned based upon increasing quantity of detected bus error frames, i.e., an increasing bus error count. Known CAN bus protocols include providing network-wide data consistency, which can lead to globalization of local errors. This permits a faulty, non-silent controller to corrupt a message on the CAN bus 15 that originated at another of the controllers.

A communications fault leading to a lost message on the CAN bus can be the result of a fault in one of the controllers, a fault in one of the communications links of the CAN bus, a fault in one of the power links of the power grid, and a fault in one of the ground links of the ground grid. Topology graphs can be developed, including a communications topology, a power topology and a ground topology. A reachability analysis is conducted for each of the topology graphs with an open link removed. One embodiment of a reachability analysis of a topology graph is described as follows with reference to FIG. 2.

Figure 2:
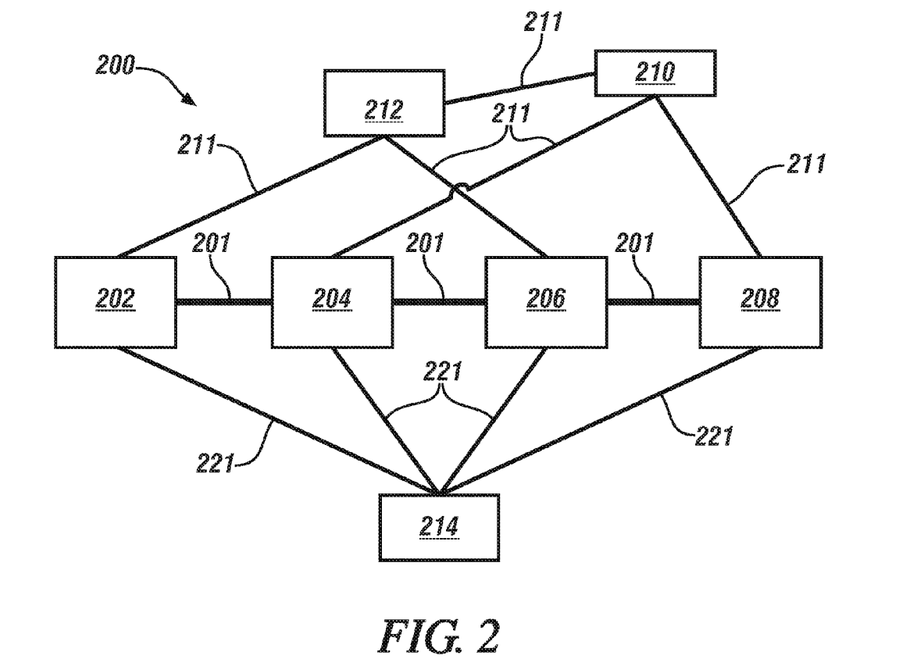
FIG. 2 illustrates an exemplary CAN including controllers, monitoring controller, power supply, battery star and ground, each connected via a link as shown in accordance with the disclosure.

FIG. 2 illustrates a network topology for an exemplary CAN 200 including controllers ECU1 202, ECU2 204 and ECU3 206, monitoring controller (monitor) 208, power supply 210, battery star 212 and ground 214, which are connected via communications links 201, power links 211, and ground links 221 as shown. The monitor 208 observes symptoms that indicate various fault sets, with each fault set having a corresponding fault signature that includes a set of inactive controllers. The monitoring function is shown as being executed by monitor 208, but it is understood that any of or all of the controllers ECU1 202, ECU2 204, ECU3 206 and monitor 208 on the communications bus can be configured to execute a fault diagnosis since any message on the CAN bus can be observed at any of and all of the controller nodes.

A fault model is generated for the network topology and includes a plurality of symptoms observed by the monitoring controller for each of a plurality of faults and a corresponding fault signature vector $V_f^{inactive}$ that includes a set of observed inactive controllers associated therewith. An exemplary fault model associated with the network topology depicted with reference to FIG. 2 includes the following with reference to Table 1, wherein the network topology for the CAN 200 includes controllers 202 [ECU1], ECU2 204 [ECU2] and ECU3 206 [ECU3], monitor 208 [$ECU_M$], power supply 210 [PS], battery star 212 [BS] and ground 214 [G]. The fault model is derived employing a reachability analysis of the network topology wherein symptoms are individually induced and communications are monitored to determine which of the controllers is inactive for each symptom.

TABLE 1

| Fault Set | Symptom | Contents of Fault signature vector $V_f^{inactive}$ |
|---|---|---|
| f1 | Open Link [ECU1]-[ECU2]<br>Open Link [ECU1]-[PS]<br>Open Link [ECU1]-[G]<br>[ECU1] Fault | [ECU1] |
| f2 | Open Link [ECU2]-[PS]<br>Open Link [ECU2]-[G]<br>[ECU2] Fault | [ECU2] |
| f3 | Open Link [ECU3]-[BS]<br>Open Link [ECU3]-[G]<br>[ECU3] Fault | [ECU3] |
| f4 | Open Link [ECU2]-[ECU3] | [ECU1], [ECU2] |
| f5 | Open Link [PS]-[BS] | [ECU1], [ECU3] |
| f6 | Open Link [ECU1]-[ECU2]<br>CAN bus wire short | [ECU1], [ECU2], [ECU3] |

A first fault set f1 can include a symptom of an open power link 211 between one of controller ECU1 202 and battery star 212, an open ground link 221 between controller ECU1 202 and ground 214, an open communications link 201 between controller ECU1 202 and controller ECU2 204, and a fault with controller ECU1 202, with a corresponding fault signature vector $V_f^{inactive}$ including controller ECU1 202 as inactive. A second fault set f2 can include a symptom of an open power link 211 between one of controller ECU2 204 and battery 210, an open ground link 221 between controller ECU2 204 and ground 214, and a fault with controller ECU2 204, with a corresponding fault signature vector $V_f^{inactive}$ including controller ECU2 204 as inactive. A third fault set f3 can include a symptom of an open power link 211 between one of controller ECU3 206 and battery star 212, an open ground link 221 between controller ECU3 206 and ground 214, and a fault with controller ECU3 206 with a corresponding fault signature vector $V_f^{inactive}$ including controller ECU3 206 as inactive. A fourth fault set f4 can include a symptom of an open communications link 201 between controller ECU2 204 and controller ECU3 206 with a corresponding fault signature vector $V_f^{inactive}$ including controllers ECU1 202 and ECU2 204 as inactive. A fifth fault set f5 can include a symptom of an open power link 211 between battery 210 and battery star 212 with a corresponding fault signature vector $V_f^{inactive}$ including controllers ECU1 202 and ECU3 206 as inactive. A sixth fault set f6 can include a symptom of an open communications link 201 between monitor 208 and controller ECU3 206 with a corresponding fault signature vector $V_f^{inactive}$ including controllers ECU1 202, ECU2 204 and ECU3 206 as inactive. Other fault signature vectors $V_f^{inactive}$ may be developed in accordance with a specific architecture of a CAN system employing a reachability analysis of a topology graph of the CAN. The monitoring function including fault diagnosis can be executed in any of or all of the controllers ECU1 202, ECU2 204, ECU3 206 and monitor 208 to identify fault(s) in the communications links 201, power links 211 and ground links 221 and identify inactive controller(s), if any. This allows development of suitable fault sets and symptoms and corresponding fault signature vectors $V_f^{inactive}$ to isolate to a single actionable fault in the CAN.

An on-board routine to derive fault signatures for a CAN for in-vehicle communication network is now described. The derived fault signatures enable fault diagnosis for in-vehicle communication faults including faults associated with the communications link 201, power link 211 and ground link 221 in the form of one or more link-open faults, controller faults, and link-short faults. The algorithm requires much less memory and CPU time for onboard implementation than known approaches of reachability analysis that include multiplications of the connection matrix. A complexity comparison indicates that the complexity of a communications network having N nodes can be determined in accordance with $O(N^2)$ when employing the system described herein, in contrast with a complexity factor determined in accordance with $O(N^5)$ for known systems. This reduction in complexity results in cost reduction of onboard implementation of controllers and a corresponding improvement in reliability.

Figure 3:
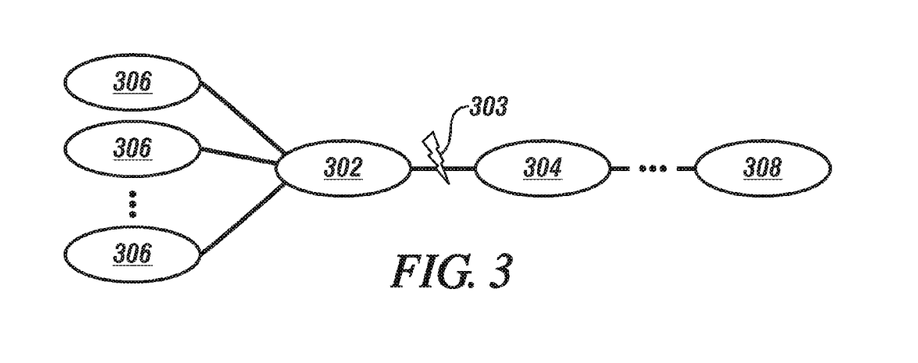
FIG. 3 illustrates an on-board CAN monitoring routine that detects inactive controllers in a CAN, in accordance with the disclosure.

FIG. 3 schematically shows a network topology 300 that includes a monitoring controller (monitor) 308 and a plurality of communicating nodes including Node k 304, Node j 302, and Nodes $n_i$ 306, i.e., $n_1, n_2, \ldots n_m$. One can observe that a fault signature detected by monitor 308 that is associated with a fault in the link 303 between Node j 302 and Node k 304 includes all the controllers and other nodes that are in the fault signature sets of links between Nodes $n_i$ (i=1, 2, ..., m) 306 and Node j 302, since those links connect to the monitor 308 through the link 303. Furthermore, Node j 302 is also in the fault signature set when it is a controller. A communications fault leading to a lost message on the CAN bus can be the result of a fault in one of the controllers, a fault in one of the communications links of the CAN bus, a fault in one of the power links of the power grid, and a fault in one of the ground links of the ground grid.

Figure 4:
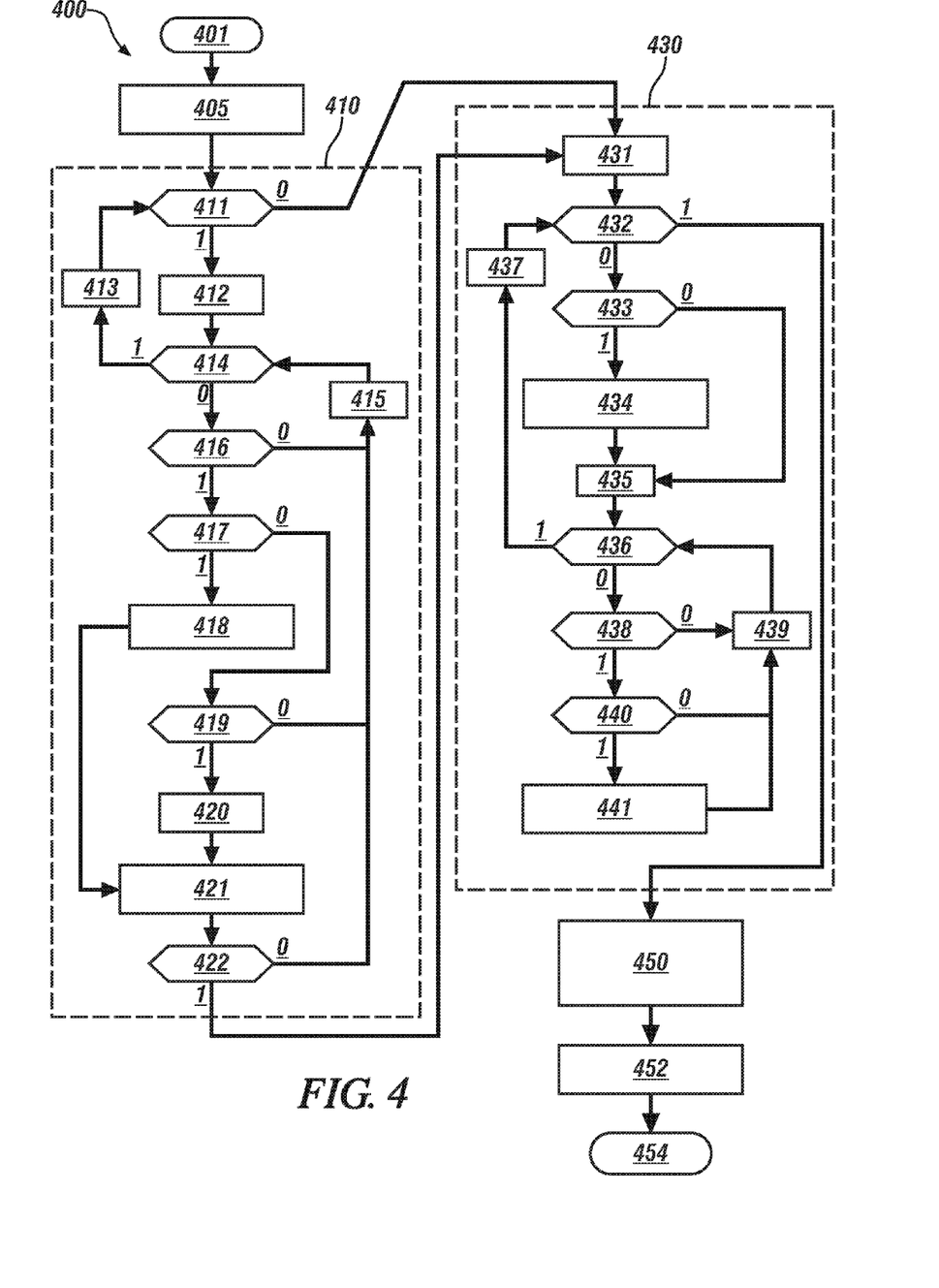
FIG. 4 illustrates an on-board routine to derive fault signatures for a CAN, in accordance with the disclosure.

FIG. 4 schematically illustrates an embodiment of an on-board routine 400 to derive fault signatures for a CAN that can be employed on a mobile system including a plurality of CAN elements that include a plurality of linked nodes including an on-board monitoring controller (monitor). This includes identifying communications links and associated nodes between all the nodes of the CAN. Each of the links is ranked according to its order of connection to the monitoring controller. Lower ranks are assigned to ones of the communications links proximal to the monitoring controller and higher ranks are assigned to ones of the links distal to the monitoring controller. Furthermore, for each link, the associated node distal to the monitor is identified. The on-board monitoring controller determines a fault signature for each of the links starting with the link having the highest ranking, with each of the fault signatures including identified ones of the associated nodes that are distal to the monitor for each of the corresponding links. Proximity of a node to the monitoring controller is determined in context of a quantity of nodes and links located between or intervening between the subject node and the monitor.

The on-board routine 400 derives fault signatures for a CAN, e.g., the CAN described with reference to FIG. 1. Initially the rank of each of the links is set to zero (lrank(i)=0, for i=1, ..., nlink). The monitor is identified as fnode[0] and it is the first node evaluated. The rank k=1 is selected as the first rank, and counter n is initialized (n=0), and an iterative process is executed to evaluate and rank the nodes (405).

Subroutine 410 operates to rank all the links according to their proximity and order of connection to the monitor. Lower ranks are assigned to ones of the links proximal to the monitor and higher ranks are assigned to ones of the links distal to the monitor. One embodiment of subroutine 410 that operates to rank all the links according to their order of connection to the monitor is described with reference to FIG. 4 and Table 2, which is provided as a key wherein the numerically labeled blocks and the corresponding functions are set forth as follows.

TABLE 2

| BLOCK | BLOCK CONTENTS |
|-------|----------------|
| 410 | Subroutine 1 |
| 411 | n<nlink? |
| 412 | m=1 |
| 413 | n=n+1 |
| 414 | m>nlink? |
| 415 | m=m+1 |
| 416 | lrank[m]=0? |
| 417 | node1[m] = fnode[n]? |
| 418 | fnode[k] = node2[m] |
| 419 | node2[m] = fnode[n]? |
| 420 | fnode[k] = node1[m] |
| 421 | lrank[m]=k; rlrank[k]=m; k=k+1 |
| 422 | k>nlink? |

The parameters include counter (n), index (m), node (node), fault node (fnode), link rank (lrank), quantity of links (nlink). The counter is compared to the quantity of links to determine if all links have been evaluated (n<nlink$^2$) (411), and if so (411)(0), operation proceeds to the second subroutine 430. Otherwise (411)(1), the index is set to 1 (m=1) (412) and the index m is compared to the quantity of links (m>nlink?) (414). When the index is greater than the quantity of links (414)(1), the counter n is incremented (n=n+1) (413) and the routine restarts (411). When the index is less than the quantity of links (414)(1), the link rank is queried to determine if it is zero (lrank[m]=0?) (416), and if not (416)(0), the index m is incremented (m=m+1) (415), and operation returns to step 414. If so (416)(1), the first node is compared to the fault node (node1[m]=fnode[n]?) (417), and if equal (417)(1), the subsequent node is set equal to the fault node (node2[m]=fnode[n]) (418), and operation advances to step 421. Otherwise (417)(0), the next node is compared to node2 (node2[m]=fnode[n]?) (419). When the next node is not equal to node2 (419)(0), index m is incremented (m=m+1) (415), and operation returns to step 414. If the next node is equal to node2 (419)(1), the fault node is set equal to the present node (fnode[k]=node1[m]) (420) and the operation sets the link rank and indexes the k term (lrank[m]=k; rlrank[k]=m; k=k+1) (421). The k index is compared to the number of links (k>nlink?) (422), and if less (422)(0), index m is incremented (m=m+1) (415), and operation returns to step 414. Otherwise (422)(1), the present iteration of subroutine 1 410 ends and operation advances to subroutine 2 430.

In this manner, the node fnode[n] (except for fnode[0]=monitor, fnode[n] is identified as the node further away from the monitor in the link with rank-n, n=1, ..., nlink). The link (link-m) that has not been ranked (lrank[m]=0) and is connected to the monitor through the link with rank-n at the node fnode[n], i.e., either node1[m]=fnode[n] or node2[m]=fnode[n] is found. The node further away from the monitor in the above link-m is stored to fnode[k], the rank of link-m is set as rank-k (lrank[m]=k), link-m is set as the link with rank-k (rlrank[k]=m), and the rank k is incremented for the next link that is to be ranked.

The on-board routine 400 to generate fault signatures for the CAN identifies which of the nodes is further away from the monitor for each link after all the links have been ranked (n=nlink). This includes starting from the link that is furthest away from the monitor (k=nlink), and checking whether the node furthest away from the monitor in the link (fnode[k]) is a controller. If so, the node is added to the fault signature set of the link-open fault for the link with rank-k, i.e., the link-rlrank[k]. All links (link-m) that have a higher rank value than rank-k (lrank[m]>k) and connect to the monitor through the link-rfrank[k] are found and the controllers in the fault signature set of the link-open fault for those links are added to the fault signature set of the link-open fault for the link-rlrank[k].

Subroutine 430 operates to generate fault signatures. After all the link-open fault signatures are derived, the ECU fault signature is set for each controller. The fault signature for the bus short fault is then set and the subroutine ends. One embodiment of subroutine 430 is described with reference to FIG. 4 and Table 3, which is provided as a key wherein the numerically labeled blocks and the corresponding functions are set forth as follows.

TABLE 3

| BLOCK | BLOCK CONTENTS |
|-------|----------------|
| 430 | Subroutine 2 |
| 431 | k=nlink |
| 432 | k=0? |
| 433 | Is fnode[k] an ECU? |
| 434 | Add fnode[k] to the fault signature set of link rlrank[k] |
| 435 | m=1 |
| 436 | m>nlink? |
| 437 | k=k−1 |
| 438 | lrank[m]>k? |
| 439 | m=m+1 |
| 440 | node1[m]=fnode[k] OR node2[m]=fnode[k]? |

TABLE 3-continued

| BLOCK | BLOCK CONTENTS |
|---|---|
| 441 | Add ECUs in the signature set of link-m to the fault signature set of link-rlrank[k] |

Subroutine 2 430 includes initializing index k to the number of links (k=nlink) (431). Index k is checked to determine if it has reached zero (k=0?) (432). If not, indicating not all the nodes have been evaluated, the present node (fnode[k]) is evaluated to determine if it is a controller (Is fnode[k] an ECU?) (433), and if so (433)(1), the present node (fnode[k]) is added to the fault signature set of link rlrank[k] (434). Otherwise (433)(0), index m is initialized to 1 (m=1) (435). Index m is compared to the number of links (m>nlink?) (436), and if greater than the number of links (436)(1), index k is decremented (k=k−1) (437), and Index k is checked to determine if it has reached zero (k=0?) (432). If index k is not greater than the number of links (436)(0), the link rank is evaluated to determine if it is greater than index k (438). If so (438)(1), index m is incremented (m=m+1) (439), and index m is again compared to the number of links (m>nlink?) (436). If not so (438)(0), nodes 1 and 2 are evaluated to determine if they are fault nodes (node1[m]=fnode[k] OR node2[m]=fnode[k]?) (440). If not (440)(0) index m is incremented (m=m+1) (439), and index m is again compared to the number of links (m>nlink?) (436). If so (440)(1), the controllers in the set of link-m are added to the fault signature set of link-rlrank [k] (441) and index m is incremented (m=m+1) (439), and index m is again compared to the number of links (m>nlink?) (436). Operation of subroutine 430 ends when index k has reached zero (k=0?) (432)(1). Thus, after all the link-open fault signatures are derived, the ECU fault signature is set for each controller. The fault signature for the bus short fault is then set and the routine ends.

Subsequent operation includes adding each controller (ECU) to its own fault signature set and adding all the controllers to the signature set of the bus short fault (450), and the fault signatures are stored in programmable read only memory of an on-board controller (452), and execution ends (454). The fault signatures can be subsequent employed to isolate a fault in the CAN 500 using a suitable fault detection and isolation algorithm. This can include communicating the fault signatures to the off-board device 45 described with reference to FIG. 1 to remotely identify a fault in the CAN 50.

FIGS. 5-1 through 5-10 illustrate execution of the on-board routine 500 to derive fault signatures for an embodiment of a CAN 500, including showing progression through the on-board routine 400 to derive the fault signatures. Each of FIGS. 5-1 through 5-10 depicts an embodiment of CAN 500 including monitor 508, controllers ECU1 501, ECU2 502, ECU3 503 and ECU4 504 in-line connection 505 and communication links link_1 511 between Inline 505 and ECU3 503, link_2 512 between Inline 505 and ECU2 502, link_3 513 between monitor 508 and Inline 505, link_4 514 between ECU1 501 and monitor 508, and link_5 515 between ECU2 502 and ECU4 504. The inputs include nlink, which is the total number of bus links and the node pairs (node1[i], node2 [i]) for each link-i, i=1, . . . , nlink.

Figure 51:
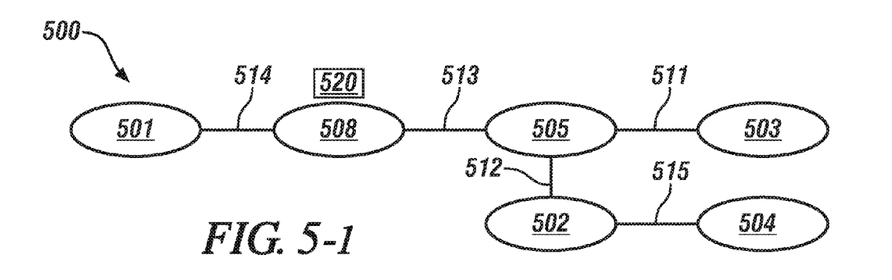

Variables preferably include the following:
lrank[i]—the rank of link-i, i=1, . . . , nlink;
rfrank[j]—the link with the rank j, j=1, . . . , nlink;
fnode[i]—the node further away from the monitor in the link with rank-i, i=1, . . . , nlink; and
fnode[0]=monitor Inputs preferably include the following links and associated nodes:
nlink=5;
link_1=(Inline 505, ECU3 503);
link_2=(Inline 505, ECU2 502);
link_3=(monitor 508, Inline 505);
link_4=(ECU1 501, monitor 508); and
link_5=(ECU2 502, ECU4 504).

Variables preferably include the following:
lrank[m]—the rank of link_m, m=1, . . . , 5;
rlrank[k]—the link with the rank k, k=1, . . . , 5, i.e., lrank[rlrank[k]]=k;
fnode[k]—the node further away from the monitor in the link with rank-k, k=1, . . . , 5, whereas fnode[0]=monitor 508.

FIG. 5-1 shows results of Step 0, which includes initially setting lrank[m]=0 for m=1, . . . , 5, and rank k=1, n=0. Fnode[0]=monitor 508 (520). Step 1 includes for fnode[n] (=monitor 508 since n=0), finding all the links (link_m) that have not been ranked (i.e., lrank[m]=0) and connect to fnode [n] (=monitor 508).

Figure 52:
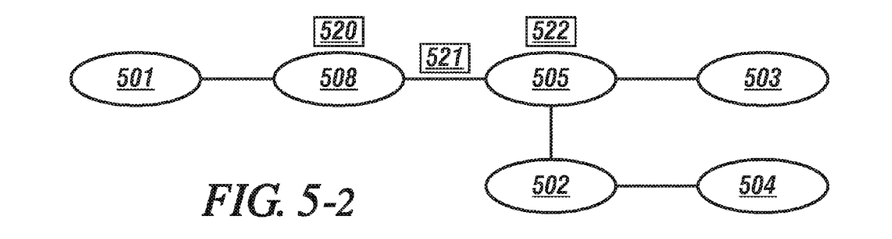

FIG. 5-2 shows results of Step 2 after the execution of the subroutine 410 in FIG. 4 with n=0 and m=3. This includes finding the first link, which is link_3 513. Its rank is set to the current rank k (k=1), i.e., lrank[3]=1 and rlrank[1]=3 (521), and the node in link_3 513 other than fnode[n] (=monitor 508) that is further away from the monitor 508 is stored to fnode[k], i.e., fnode[1]=Inline 505 (522), and the rank k is incremented, i.e., k=k+1=2.

Figure 53:
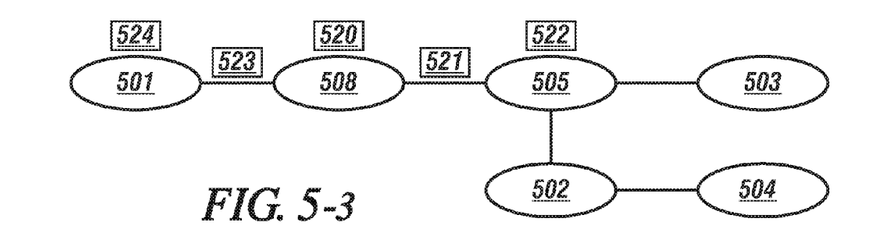

FIG. 5-3 shows results of Step 3, after the execution of the subroutine 410 in FIG. 4 with n=0 and m=4. This includes finding the next link, which is link_4 514. Its rank is set to the current rank k (k=2), i.e., lrank[4]=2 and rfrank[2]=4 (523), and the node in link_4 514 other than fnode[n] (which is further away from the monitor 508) is stored to fnode[k], i.e., fnode[2]=ECU1 (524) and the rank k is incremented, i.e., k=k+1=3;

Step 4 includes the following. Since no other un-ranked links connects to fnode[0] (=monitor 508), n is incremented, i.e., n=n+1=1. Step 2 is repeated with fnode[n]=fnode[1]= Inline 505 to find all the un-ranked links that connect to fnode[n]=Inline 505.

Figure 54:
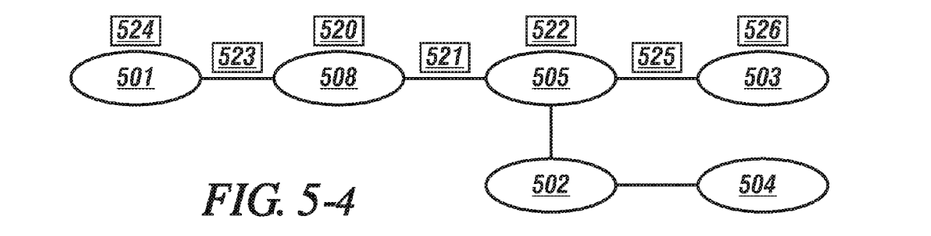

FIG. 5-4 shows the result before the execution of the subroutine 410 in FIG. 4 with n=1 and m=1.

Figure 55:
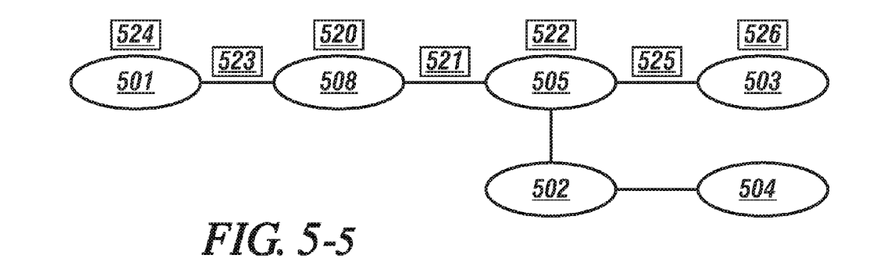

FIG. 5-5 shows the results of Step 5 after the execution of the subroutine 410 in FIG. 4 with n=1 and m=1, in which the first link found is link_1 511. Its rank is set to the current rank k (k=3), i.e., lrank[1]=3 and rlrank[3]=1 (525), and the node in link_1 511 other than fnode[1] (=Inline 505), which is further away from the monitor 508, is stored to fnode[k], i.e., fnode[3]=ECU3 (526), and the rank k is incremented, k=k+ 1=4.

Figure 56:
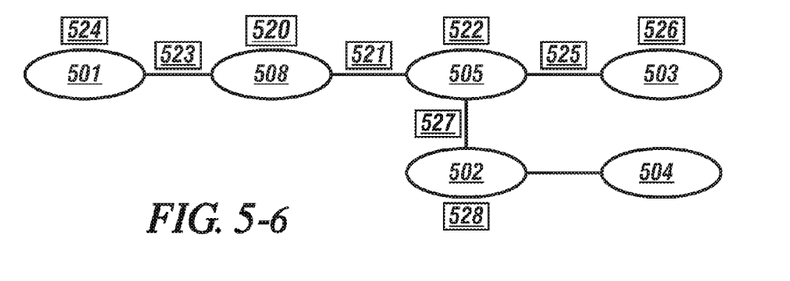

FIG. 5-6 shows the results of Step 6, after the execution of the subroutine 410 in FIG. 4 with n=1 and m=2, in which the next link found is link_2 512. Its rank is set to the current rank k (k=4), i.e., lrank[2]=4 and rfrank[4]=2 (527), and the node in link_2 512 other than fnode[1], which is further away from the monitor 508, is stored to fnode[k], i.e., fnode[4]=ECU2 (528) and the rank k is incremented, i.e., k=k+1=5.

Figure 57:
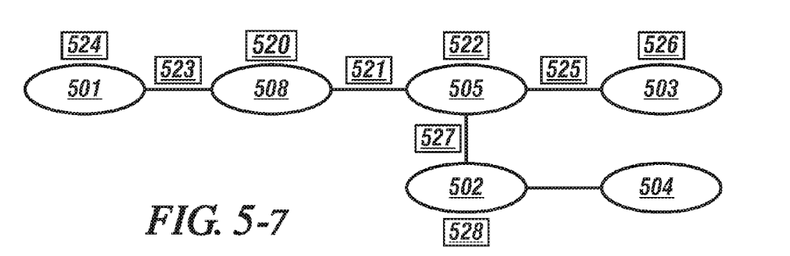

FIG. 5-7 shows the results of Step 7, after the execution of the subroutine 410 in FIG. 4 with n=2 and m=5. This includes the following. Since no other un-ranked links connects to fnode[1] (=Inline 505), n is incremented (n=n+1=2) and repeat Step 2 with fnode[n]=fnode[2]=ECU1 to find all the un-ranked links that connect to fnode[2]=ECU1.

Figure 58:
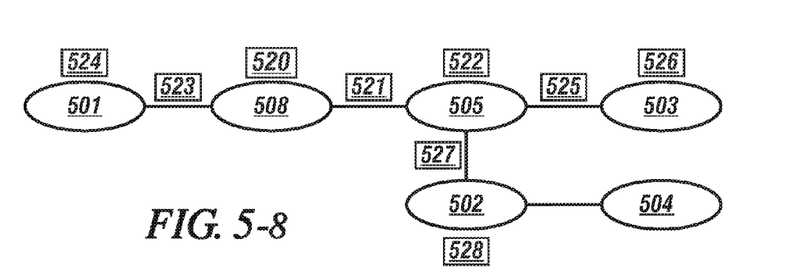

FIG. 5-8 shows Step 8, after the execution of the subroutine 410 in FIG. 4 with n=3 and m=5. This includes the following.

Since no un-ranked links connects to fnode[2] (=ECU1), n is incremented (n=n+1=3) and repeat Step 2 with fnode[n]=fnode[3]=ECU3 to find all the un-ranked links that connect to fnode[3]=ECU3.

Figure 59:
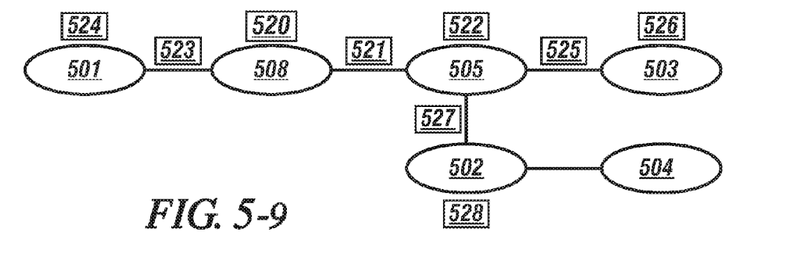

FIG. 5-9 shows Step 9, before the execution of the subroutine 410 in FIG. 4 with n=4 and m=1. This includes the following. Since no un-ranked links connects to fnode[3] (=ECU3), n is incremented (n=n+1=4) and repeat Step 2 with fnode[n]=fnode[4]=ECU2 to find all the un-ranked links that connect to fnode[4]=ECU2.

Figure 510:
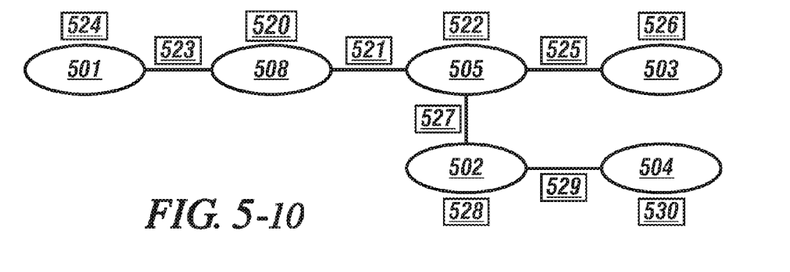

FIG. 5-10 shows Step 10, after the execution of the subroutine 410 in FIG. 4 with n=4 and m=5, which includes the following. The first link found is link_5 515, and its rank is set to the current rank k (k=5), i.e., lrank[5]=5 and rlrank[5]=5 (529), and the node in link_5 515 other than fnode[4] (=ECU2) (which is further away from the monitor 508) is stored to fnode[k], i.e., fnode[5]=ECU4 (530) and the rank k is incremented, k=k+1=6.

Step 11 relates to the transition from subroutine 410 to subroutine 430 in FIG. 4 and includes the following. Since k=6>nlink=5, all the links have been ranked. The fault signatures can be obtained for each link-open fault starting from the link ranked with nlink=5 by first identifying which of the nodes is further away from the monitor 508 for each link.

Steps 12-16 relate to results obtained after iterations of subroutine 430 in FIG. 4.

Step 12 includes the following. Since rlrank[5]=5, the highest ranked link is link_5 515. Because fnode[5]=ECU4 and it is a controller, ECU4 is added to the fault signature set of link_5 515 open. Since no other links connect to fnode[5]= ECU4, there are no other updates for the fault signature of link_5 515, and the fault signature for link_5 515 open is {ECU4}.

Step 13 includes the following. Since rfrank[4]=2, the next link is link_2 512. ECU2 is added to the fault signature set of link_2 512 because fnode[4]=ECU2 and it is a controller. The fault signature of link_5 515 is added since link_5 515 connects to fnode[4] and has a higher rank than link_2 512, and the final fault signature for link_2 512 open is {ECU2, ECU4}.

Step 14 includes the following. Since rlrank[3]=1, the next link is link_1 511. ECU3 is added to the fault signature set of link_1 511 because fnode[3]=ECU3 and it is a controller. Since no other links connects to fnode[3]=ECU3, there are no other updates for the fault signature of link_1 511, and the fault signature for link_1 511 open is {ECU3}.

Step 15 includes the following. Since rfrank[2]=4, the next link is link_4 514. ECU1 is added to the fault signature set of link_4 514 because fnode[2]=ECU1 and it is a controller. Since no other links connects to fnode[2]=ECU1, there are no other updates for the fault signature of link_4 514, and the fault signature for link_4 514 open is {ECU1}.

Step 16 includes the following. Since rlrank[1]=3, the next link is link_3 513. Since fnode[1]=Inline 505 and it is not a controller, there is no need to add it to the fault signature set. The fault signatures of link_1 511 and link_2 512 are added since both connect to fnode[1]=Inline 505 and both have a higher rank than link_3 513. The final fault signature for link_3 513 open is {ECU2, ECU3, ECU4}.

Step 17 is associated with execution of subroutine 530 of FIG. 4, and includes the following. Each controller is added to its own controller fault signature set, i.e., the fault signature for ECU_i fault is {ECU_i}, i=1, 2, 3, 4. All the controllers are added to the fault signature of bus short fault, i.e., the fault signature for the bus short fault is {ECU_i, i=1, 2, 3, 4}.

The fault signatures can be stored in memory, and/or communicated to an off-board device 45 to remotely isolate a fault in the CAN 50 in response to an indicated fault. Isolating a fault in the CAN 50 includes identifying one or a plurality of controllers and/or communication links at which the fault occurs using the fault signature sets.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A method for monitoring a controller area network (CAN) on a mobile system comprising a plurality of linked nodes including an on-board monitoring controller, comprising:
   identifying communications links and associated nodes between the nodes of the CAN;
   ranking the communications links according to their order of connection to the monitoring controller, including assigning lower ranks to ones of the communications links proximal to the monitoring controller and assigning higher ranks to ones of the communications links distal to the monitoring controller;
   for each of the communications links, identifying which of the associated nodes is distal to the monitoring controller; and
   determining, using the monitoring controller, a fault signature for each of the communications links based upon the identified node distal to the monitoring controller for each of the communications links.

2. The method of claim 1, wherein determining, using the monitoring controller, a fault signature for each of the communications links based upon the identified node distal to the monitoring controller for each of the communications links comprises determining, using the monitoring controller, a fault signature for each of the communications links starting with the communications link having the highest ranking, said fault signature comprising identified ones of the associated nodes distal to the monitoring controller for each of the corresponding communications links.

3. The method of claim 1, further comprising employing the fault signature to isolate a fault in the CAN in response to an indicated fault.

4. The method of claim 3, wherein employing the fault signature to isolate a fault in the CAN in response to an indicated fault comprises employing the fault signature to isolate the fault in the CAN to a communication link in response to the indicated fault.

5. The method of claim 1, further comprising:
   communicating the fault signatures for the communications links to an off-board device; and
   in response to an indicated fault, employing the off-board device to isolate the fault in the CAN based upon the fault signatures for the communications links.

6. The method of claim 1, wherein determining, using the monitoring controller, a fault signature for each of the communications links starting with the communications link having the highest ranking, said fault signature comprising identified ones of the associated nodes distal to the monitoring controller for each of the corresponding communications links comprises:
   identifying the associated nodes distal to the monitoring controller for the highest ranking communications link, and generating a corresponding fault set comprising the identified associated nodes; and iteratively decrementing the ranking, identifying the associated nodes distal to the monitoring controller for the communications link associated with the decremented ranking, and generating a corresponding fault set comprising the identified associated nodes.

7. The method of claim 1, wherein determining, using the monitoring controller, a fault signature for each of the communications links comprises determining a fault signature including one of a bus link open fault, a controller fault, and a bus short fault.

8. An on-vehicle method for monitoring a controller area network (CAN) including a plurality of linked communication nodes, comprising:
- identifying communication links between the linked communication nodes of the CAN including an on-board monitoring controller;
- identifying pairs of the communications nodes associated with each of the communication links;
- identifying which of the associated communication nodes is distal to the monitoring controller for each communication link;
- ranking the communication links according to their order of connection to the monitoring controller, including assigning lower ranks to the communication links proximal to the monitoring controller and assigning higher ranks to the communication links distal to the monitoring controller; and
- determining, using the monitoring controller, a fault signature for each of the communication links starting with the communication link having the highest ranking, said fault signature comprising identified ones of the associated communication nodes distal to the monitoring controller for each of the corresponding communication links.

9. The method of claim 8, further comprising employing the fault signature to isolate a fault in the CAN in response to an indicated fault.

10. The method of claim 8, further comprising:
- communicating the fault signatures for the communications links to an off-board device; and
- in response to an indicated fault, employing the off-board device to isolate the fault to a communications link in the CAN based upon the fault signatures for the communications links.

11. The method of claim 8, wherein determining, using the monitoring controller, a fault signature for each of the communications links starting with the communications link having the highest ranking, said fault signature comprising identified ones of the associated nodes distal to the monitoring controller for each of the corresponding communications links comprises:
- identifying the associated nodes distal to the monitoring controller for the highest ranking communications link, and generating a corresponding fault set comprising the identified associated nodes; and
- iteratively decrementing the ranking, identifying the associated nodes distal to the monitoring controller for the communications link associated with the decremented ranking, and generating a corresponding fault set comprising the identified associated nodes.

12. The method of claim 8, wherein determining, using the monitoring controller, a fault signature for each of the communications links comprises determining a fault signature including one of a bus link open fault, a controller fault, and a bus short fault.

* * * * *